(12) United States Patent  
Shattuck

(10) Patent No.: US 6,588,766 B2
(45) Date of Patent: Jul. 8, 2003

(54) GASKET WITH INTEGRAL CHANNEL AND PORT SEAL

(75) Inventor: Don Shattuck, Springfield, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/021,427

(22) Filed: Oct. 30, 2001

(65) Prior Publication Data

US 2002/0130471 A1 Sep. 19, 2002

Related U.S. Application Data

(63) Continuation of application No. 09/295,682, filed on Apr. 21, 1999, now Pat. No. 6,325,388.

(51) Int. Cl.$^7$ .................................................. F02F 11/00
(52) U.S. Cl. ........................................ 277/591; 277/594
(58) Field of Search ................................. 277/591, 594, 277/600, 644, 399

(56) References Cited

U.S. PATENT DOCUMENTS

| 854,234 A | 5/1907 | Perry |
| 1,798,246 A | 3/1931 | Braner |
| 2,828,988 A | 4/1958 | Gorsica et al. |
| 3,202,463 A | 8/1965 | Fatt |
| 3,206,218 A | 9/1965 | Potter et al. |
| 3,473,813 A | 10/1969 | Meyers et al. |
| 3,811,689 A | 5/1974 | Farnam |
| 3,863,936 A | 2/1975 | Farnam et al. |
| 3,936,059 A | 2/1976 | Gordon |
| 4,272,085 A | 6/1981 | Fujikawa et al. |
| 4,442,733 A | 4/1984 | Hartz |
| 4,449,422 A | 5/1984 | Fuehrer et al. |
| 4,580,794 A | 4/1986 | Gibbons |
| 4,946,737 A | 8/1990 | Lindeman et al. |
| 5,156,539 A | 10/1992 | Anderson et al. |
| 5,639,103 A | 6/1997 | Jeanne et al. |
| 5,653,450 A | 8/1997 | De Villepoix et al. |
| 5,890,719 A | 4/1999 | Bettencourt |

Primary Examiner—Lynne H. Browne
Assistant Examiner—James M. Hewitt
(74) Attorney, Agent, or Firm—Stephen E. Feldman

(57) ABSTRACT

A novel gasket is provided for filling the space between two mating surfaces on components in an automotive transmission. The gasket includes one or more patches of silicone integrated into a portion of the gasket for providing one or more channels through the gasket, having leak proof seals at the ends of the channel. Bolt passage holes are spaced in the gasket to register with corresponding bolt holes in the mating surfaces. A channel aperture passes through the portion of the gasket augmented with the silicone patch, providing a channel between the mating surfaces. The ends of the channel define leak proof seals between the gasket and the mating surfaces for providing a leak proof fluid flow channel between the mating surfaces.

13 Claims, 2 Drawing Sheets

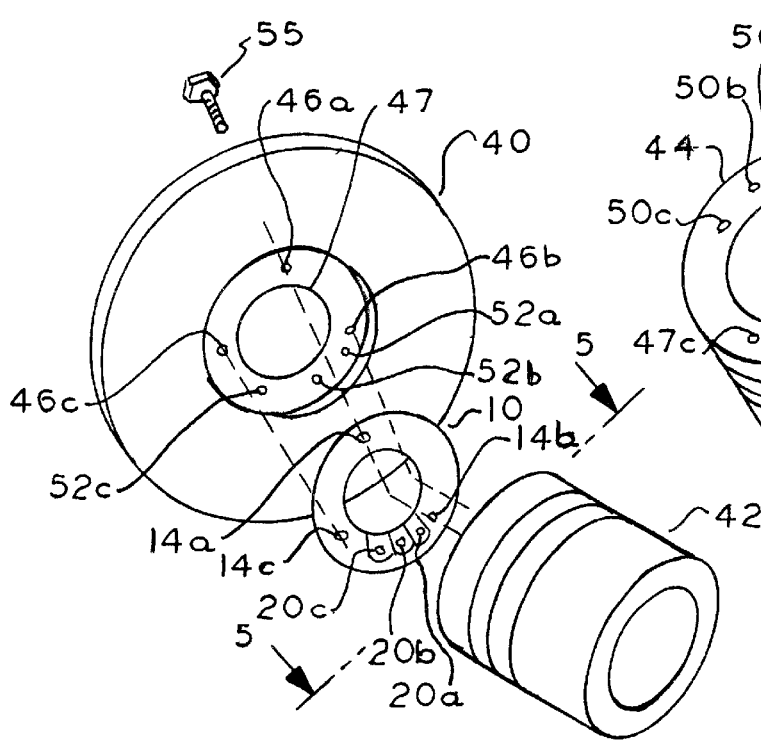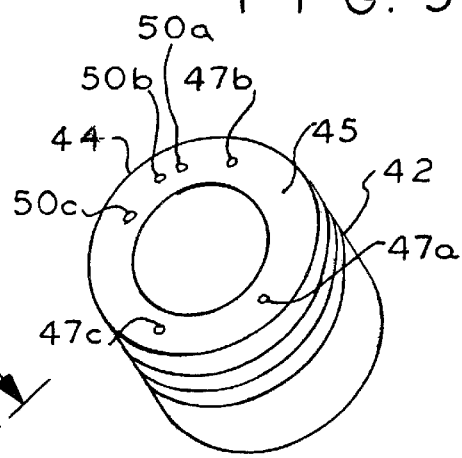

GASKET WITH INTEGRAL CHANNEL AND PORT SEAL

This application is a continuation application of co-pending application Ser. No. 09/295,682 filed Apr. 21, 1999 now U.S. Pat. No. 6,325,388.

BACKGROUND OF THE INVENTION

1. Field of the Invention

The present invention relates to gaskets for inserting between two mating surfaces for padding and/or filling spaces such as manufacturing tolerances in the surfaces and/or preventing intimate contact between the two mating surfaces. The present invention more particularly relates to gaskets for inserting between two mating surfaces wherein the gasket has integrated therein a channel which permits communication between the two mating surfaces.

2. Prior Art

Gaskets are often used for filling in space and/or for padding between two mating surfaces. It is normal that the spaces between two mating surfaces are products of manufacturing tolerances and/or acceptable defects in the mating surfaces of the components fitted together and/or the potential space between the two mating surfaces where there is a different coefficient of thermal expansion between the materials fabricating the surfaces on the two components that are mated. In addition, some gaskets are used to form seals between two mating surfaces for preventing leakage between the mating surfaces.

U.S. Pat. No. 4,442,733 to Hartz, issued in April 1984, teaches a spacer which forms a gasket between two surfaces where the spacer is fabricated from a special, elastomeric material, having a coefficient of thermal expansion exceeding the coefficient of thermal expansion of the material forming the components separated by the spacer. U.S. Pat. No. 4,580,794 to Gibbons, issued in April 1986 teaches a joining and sealing gasket fabricated from special, heat cured silicone rubber with specific rubber composition, for filling a space between two surfaces. U.S. Pat. No. 5,156,539 to Anderson et al, issued in October 1992 teaches a gasket defined as a floating seal specifically for a scroll machine, for hermetically sealing the exterior shell of the scroll machine to prevent leakage of fluid under pressure. The Hartz '733 patent and the Gibbons '794 patent each teach a spacer that provides a full seal between two mating surfaces. The spacer taught in both of these patents are fabricated from specific, expensive materials and are expensive to manufacture. The Anderson et al teaching in the '539 patent provides a complex, speciality floating seal, designed specifically for use in a particular machine, a scroll machine.

SUMMARY OF THE INVENTION

The present invention provides a printed gasket for filling in gaps and space between two mating surfaces, which gaps and/or spaces are defined by manufacturing tolerances and/or surfaces blemishes in the mating surfaces. The gasket member includes one or more centrally located apertures for passing connector means, such as threaded bolts or screws, for example, through the gasket for securing and holding the components in a mating condition about the gasket. Integrated into a portion of the gasket member is a silicone blanket or patch which augments the thickness of the gasket member. At least one channel means, defined by an aperture passing through the augmented portion of the gasket member is provided. The augmented portion of the gasket member further defines a seal means, at each end of the channel means, providing a leak proof seal between the channel means and the inlet and outlet port means in the mating surfaces, when the inlet and outlet port means in the mating surfaces are in registration with each other and with the channel means, for forming leak proof seals about the channel means ends and the inlet port means and the outlet port means in the mating surfaces. The present invention provides a gasket for filling space between two mating surfaces with silicone patches integrated into the gasket and at least one aperture extending through the augmented portion of the gasket, providing a leak proof channel and end seals for providing leak proof fluid flow between the outlet port means in one mating surface and inlet port means in the other mating surface, for maintaining a leak proof fluid flow between the two mated surfaces.

The present invention is especially useful for inserting between a center support member and a hub member on a transmission of a motor vehicle. Preferably, the gasket is a circular member having spaced inner and outer circumferences with the width between the two circumferences substantially two to three times the length of the diameter of bolt holes in the gasket, for passing coupling bolts between the center support member and the hub member through the gasket. The bolt holes in the gasket member, are spaced to register with the bolt holes in the mating surfaces of the center support member and the hub member. Preferably, the material from which the gasket member is fabricated is gasket material identified as Armstrong NV519, marketed by the Armstrong Corporation, the gasket material having about 0.0085 inches thickness. However, other gasket material may be used, if desired. In registration with flow ports in the mating surfaces of the center support member and the hub member, is a channel aperture in the gasket member. Integrated into the gasket member and surrounding the channel aperture is a polymer bead or patch, such as silicone, for example. The portion of the gasket covered by the silicone patch increases the thickness of the body of the gasket and the length of the channel aperture in the gasket member, by approximately 0.004 inches to 0.008 inches. When the channel aperture in the gasket member is in registration with the outlet port in one mating surface and the inlet port in the other mating surface, a channel for the flow of fluid is provided between the outlet and inlet ports of the two mated surfaces. Augmented by the polymer patch integrated into the gasket, seals are provided at the ends of the channel aperture for sealing the gasket to the mating surfaces about the inlet and outlet ports, respectively, for providing a leak proof channel between the two mating surfaces with leak proof seals between the channel ends and the ports in the mating surfaces.

BRIEF DESCRIPTION OF THE DRAWINGS

FIG. 4 is a representation of the invention, represented in FIG. 1, used between a center support and a hub, shown in exploded view; and FIG. 5 is an end view of the inside end of the hub represented in FIG. 4, shown along the lines 5—5.

DETAILED DESCRIPTION OF THE INVENTION

Figure 1:
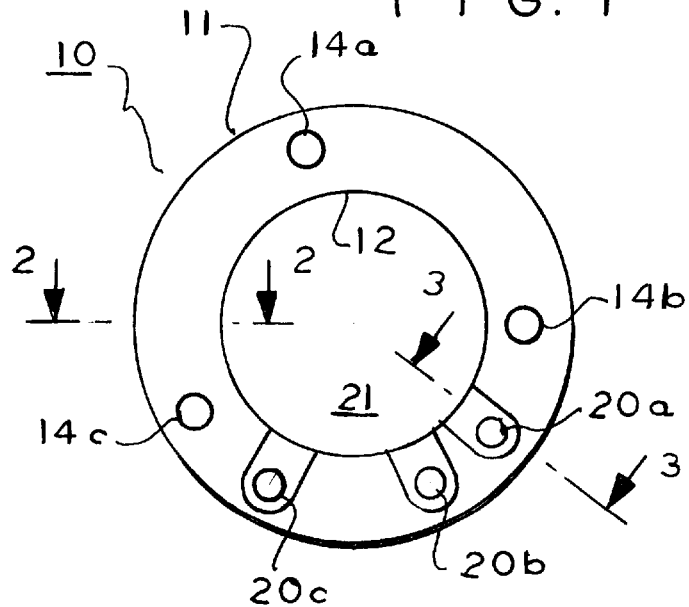
FIG. 1 is a representation of the invention.
Figure 2:
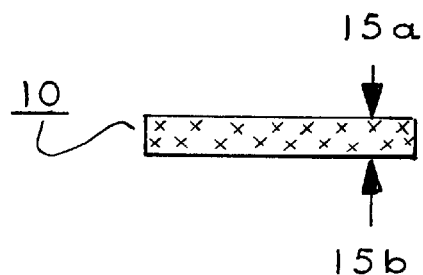
FIG. 2 is a cross section view of the invention, represented in FIG. 1, along lines 2—2.
Figure 3:
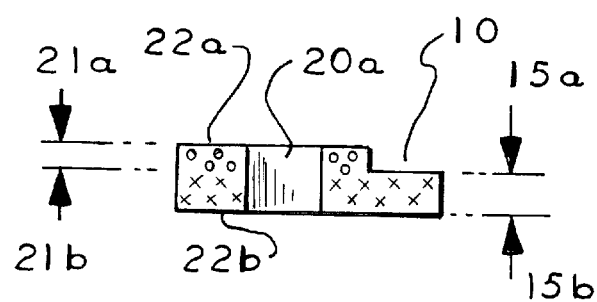
FIG. 3 is a cross section view of the invention, represented in FIG. 1, along lines 3—3.

Throughout the drawings identical parts and/or components are identified with identical call out numbers and/or letters. FIG. 1 represents an annular form of the invention with outer circumference 11 and inner circumference 12 defining the width of the gasket 10. The apertures 14a, 14b and 14c represent connector means or bolt holes in the body of the gasket, which holes register with the holt holes in the surface of the respective mating surfaces, more clearly represented in FIGS. 4 and 5. A cross section view of the body of the gasket 10, along lines 2—2 is represented in FIG. 2. The thickness of the body, as between the arrows 15a and 15b, is substantially uniform through the body of the gasket except for the augmented portion of the gasket, around the channel apertures 20a, 20b and 20c. Each channel aperture 20a, 20b and 20c, in the body of the gasket 10 is auglnented by a bead or patch of a polymer material 21, such as silicone, for example. FIG. 3 represents a cross section of the gasket body 15a–15b, augmented with the silicone patch 21a–21b, surrounding the channel aperture 20a. The periphery, or surface, at each end of the channel aperture, at 22a and 22b, for example, becomes a seal between the gasket and the juxapositioned surface when the gasket is compressed between two mating surfaces.

The bolt holes 14a, 14b and 14c, or more or fewer than represented, are centrally located in the gasket, with the center of the respective holes substantially centered between the inner circumference and the outer circumference. The arcuate position of the respective holes is such that the bolt holes in the gasket align or register with the bolt holes or connector holes in the mating surfaces, which register with corresponding holes in both mating surfaces. This permits unobstructed passage through the gasket for the connector means from one surface to the other surface to connect or couple the surfaces in mating condition.

FIGS. 4 and 5 represent components of a motor vehicle transmission, such as a center support 40 and a hub 42. The center support has a recessed surface 41 into which the base end 44 of the hub nests so that the recessed surface 41 of the center support and the surface 45 of the base end of the hub, mate. This is a typical use for a gasket.

The gasket 10 seats into the recess of the center support on the surface 41 and is aligned rotationally so that the bolt holes 14a, 14b and 14c register with the bolt holes or connector holes 46a, 46b and 46c, respectively. The hub is seated over the gasket and aligned rotationally so that the bolt holes or connector means holes 47a, 47b and 47c register with corresponding bolt holes 46a, 46b and 46c in the center support. The channel and seal ports 20a, 20b and 20c in gasket 10 align with the fluid flow ports 50a, 50b and 50c in the surface 45 of the hub 42 while the fluid flow ports 52a, 52b and 52c in the center support 40 align with the channel and seal ports 20a, 20b and 20c in the gasket, providing individual channels for fluid flow, through the gasket, between the two mating surfaces, with seals between the gasket and the contacting surfaces.

It is apparent that the gasket 10 represented in FIG. 4 is fabricated so that the bolt holes in the gasket are in registration with the bolt holes or connector holes in the surface of the center support 40 and that the connector holes in the center support 40 are positioned so as to register with the connector holes in the hub 42. Also, the fluid flow ports 52a, 52b and 52c in the surface of the center support and the fluid flow ports 50a, 50b and 50c in the surface of the hub end are positioned to register with each other respectively. Also, the channel and port seals 20a, 20b and 20c are fabricated in the gasket 10' to register or align with the corresponding fluid flow ports 50a, 50b and 50c and 52a, 52b and 52c, in the mating surfaces. When the center support and hub are connected or coupled with the gasket 10' in between, as represented in FIG. 4, the invention provides a gasket for filling space between the mating surfaces with a channel for each of the registered fluid flow ports in the mating surfaces and seals for each of the fluid flow ports in the mating surfaces, providing leak proof sealing and leak proof channels for the mating surfaces.

A threaded bolt 55 is represented in FIG. 4 and represents any connector means that may be used to hold the center support, the gasket and the hub connected and in registration. Although a particular use of the invention is represented in FIGS. 4 and 5, the principles of the invention are not limited to the particular use and extend to uses with other mating components and/or mating surfaces where there is fluid communication between mating surfaces. Compression of the gasket between the two mating surfaces provides leak proof sealing by channel aperture end seals between the fluid flow ports in both mating surfaces and the gasket channel aperture ends, such as at 22a and 22b at the ends of the channel aperture 20a, represented in FIG. 3.

In the forgoing description of the invention, referenced to the drawings, certain terms have been used for conciseness, clarity and comprehension. However, no unnecessary limitations are to be implied from or because of the terms used, beyond the requirements of the prior art, because such terms are used for description purposes and are intended to be broadly construed. Furthermore, the description and illustration of the invention are by way of example, and the scope of the invention is not limited to the exact details shown, represented or described.

Having now described a preferred embodiment of the invention, in terms of features, discoveries and principles changes that may become apparent to those skilled in the art may be made, without departing from the scope of the invention defined ha the appended claims.

What is claimed is:

1. A circular gasket having spaced inner and outer circumferences for filing the gap between hub and center support surfaces compromising:
   a gasket body defining three apertures for connectors and three channel means for the flow of liquid, a polymer material being positioned on the gasket body and defining an augmented thickness of the gasket body, the augmented thickness being positioned at least in juxtaposition with the channel means and defining a sealing means, each aperture defining an inner surface, and having a first diameter and each channel means having a second diameter, the second diameter being no greater than the first diameter, two of said apertures being substantially equally spaced from the third aperture, and said three channel means being spaced between said two apertures.

2. The gasket of claim 1, wherein the gasket body is fabricated of a non-metallic material.

3. The gasket of claim 1, wherein the gasket body defines an inner circumference for a shaft.

4. The gasket of claim 1, wherein the gasket body is fabricated of a material having the characteristics of Armstrong NV-519 gasket material.

5. The gasket of claim 1, wherein the polymer is silicone.

6. A circular gasket for filing the gap between the hub and center support surfaces in an automobile transmission comprising:
   a gasket having an outer and inner circumference fabricated of a non-metallic polymer material and defining three bolt holes and at least three channels for a liquid, the channels having an inner surface, with the three bolt holes spaced around said gasket, said three channels located between two of said bolt holes and being between located substantially midway between the outer and inner circumference and having a diameter which is substantially ¼ to ½ the distance between the outer and inner circumference, an augmented thicknesses including a second non-metallic polymer material positioned within the first material, the augmented thickness being positioned at least in proximity with the channels, and the bolt holes have a first diameter and the channels having a second diameter no greater than he first diameter.

7. The gasket of claim 6, wherein the augmented thickness forms a blanket which extends over the gasket.

8. The gasket of claim 6, wherein the gasket body is fabricated of NV-519 gasket material.

9. The gasket of claim 6, the augmented thickness is silicone.

10. An annular gasket for filling the gap between two mating surfaces, a hub and center support in an automobile transmission comprising:

a gasket having a body and defining a first side and a second side, the first side and the second side being substantially planar, at least three apertures and three channel means defined in the planar portion, the gasket body being fabricated of a non-metallic polymer material and an augmented portion blanketing the gasket, with said at least three apertures and three channels for the flow of oil therein, a polymer material defining the augmented portion and wherein said three channels are disposed between two said apertures.

11. The gasket of claim 10, wherein said apertures are at least as large as the channels wherein the gasket includes an outer circumference and an inner circumference, the width between the two circumferences being approximately two to three times larger than the diameter of at least one channel means.

12. The gasket of claim 10, wherein the polymer material includes silicone.

13. The gasket of claim 10, wherein the gasket body is fabricated of a material having the characteristics of Armstrong NV-519 gasket material.

* * * * *